United States Patent
Halton

[15] 3,680,685
[45] Aug. 1, 1972

[54] SAFETY CONVEYOR
[72] Inventor: Murray Halton, "C" and Clearfield St., Philadelphia, Pa. 19134
[22] Filed: March 27, 1970
[21] Appl. No.: 23,309

[52] U.S. Cl. .............................................. 198/232
[51] Int. Cl. ............................................. B65g 43/00
[58] Field of Search ....................................... 198/232

[56] References Cited

UNITED STATES PATENTS 2,005,122  6/1935  Young et al. ................. 198/232

FOREIGN PATENTS OR APPLICATIONS 738,268  10/1955  Great Britain ................. 198/232
1,193,657  3/1965  Germany ....................... 198/232

Primary Examiner—Richard E. Aegerter
Assistant Examiner—Douglas D. Watts
Attorney—Necho and Kimmelman

[57] ABSTRACT

A safety conveyor including a gear reducer drive for powering a driving sprocket to drive an endless chain for load transporting purposes. The gear reducer drive rotates the driving sprocket through a drive shaft which includes a flexible coupling to permit elevation of the driving sprocket in response to a jam in the conveyor mechanism. Elevation of the driving sprocket automatically trips a micro switch to de-energize the driving motor to prevent damage to any conveyor system component.

9 Claims, 7 Drawing Figures

INVENTOR
MURRAY HALTON
BY Nachoand Kimmelman
ATTORNEY

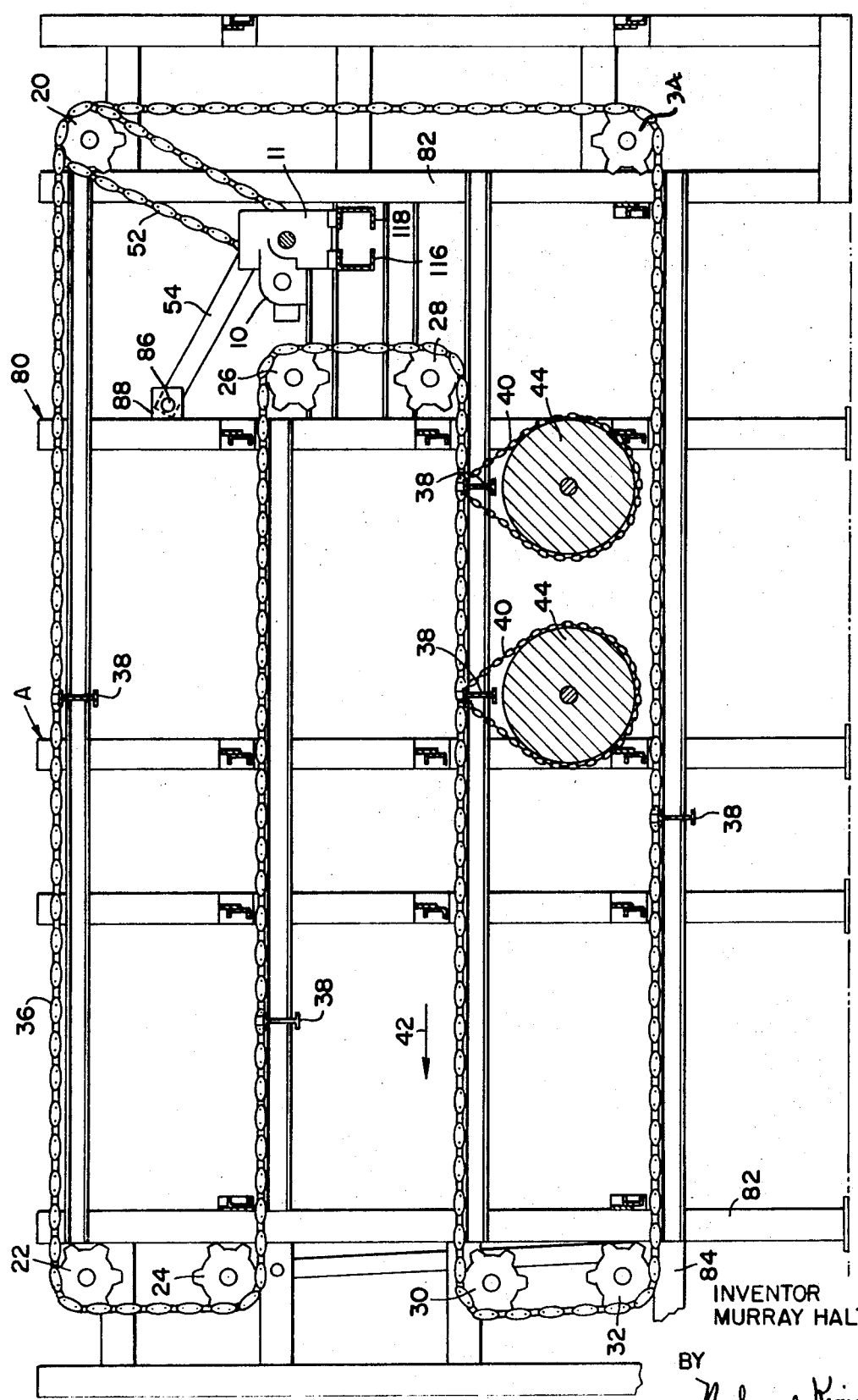

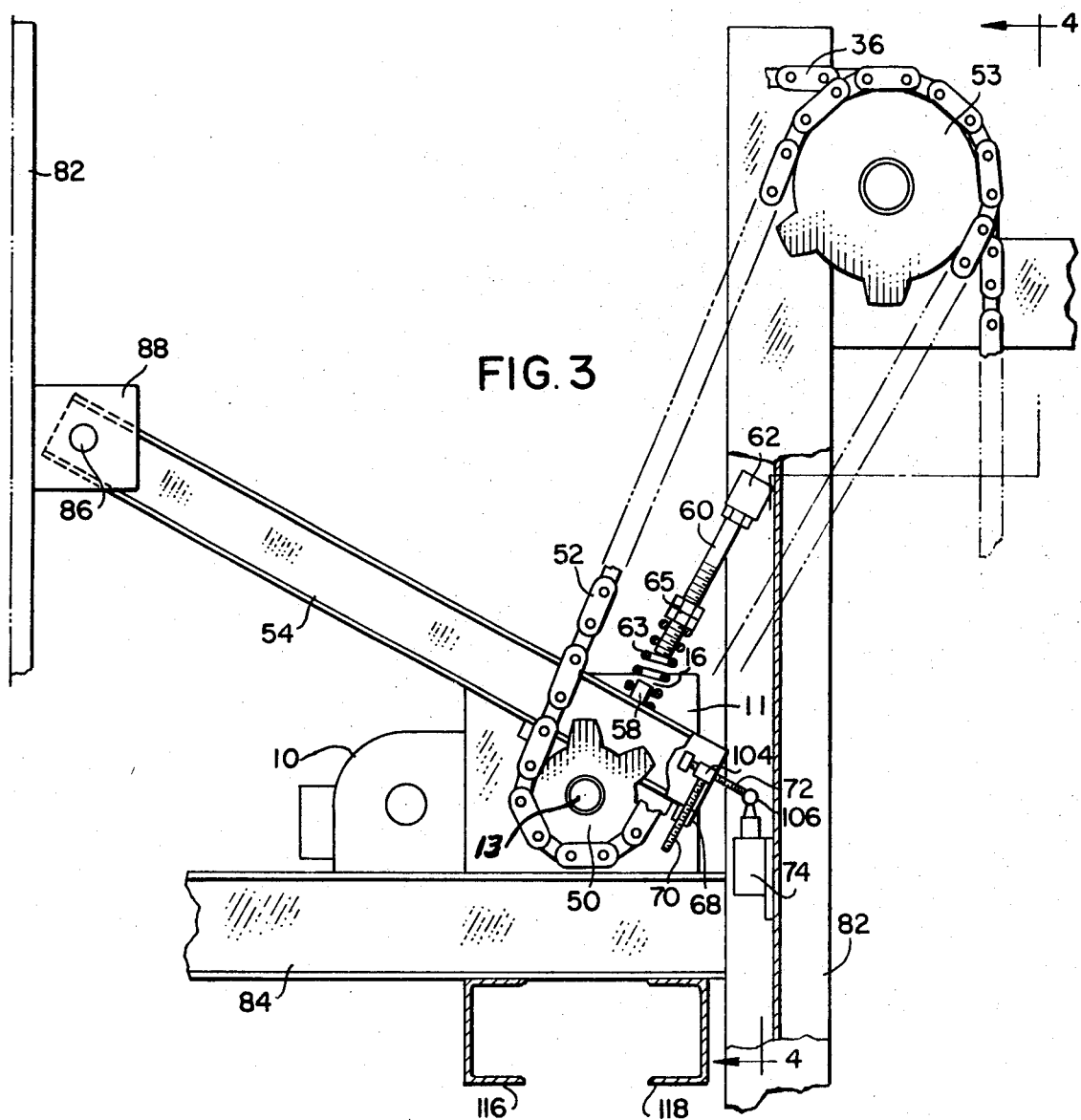
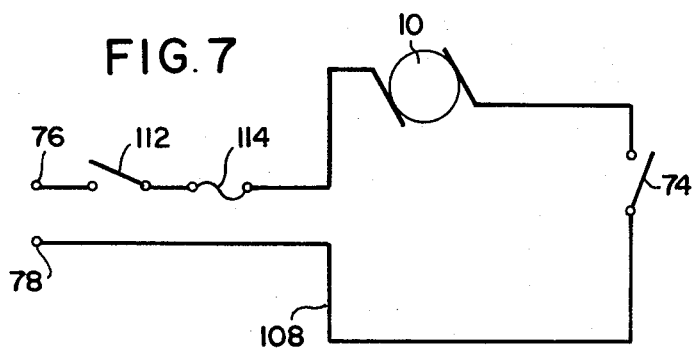

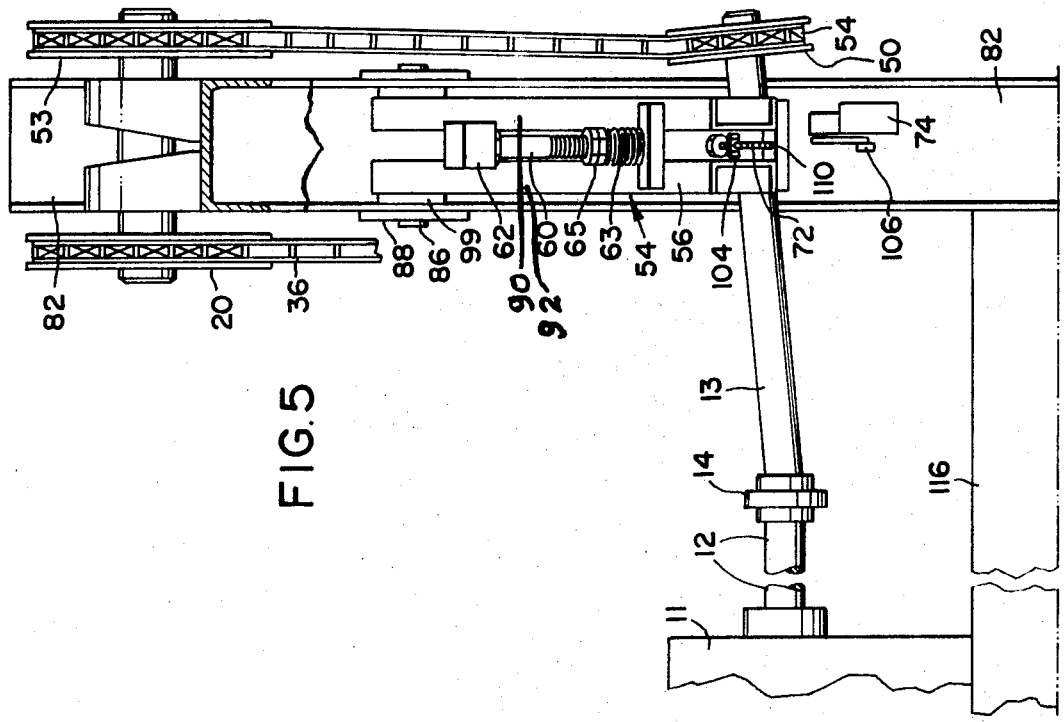
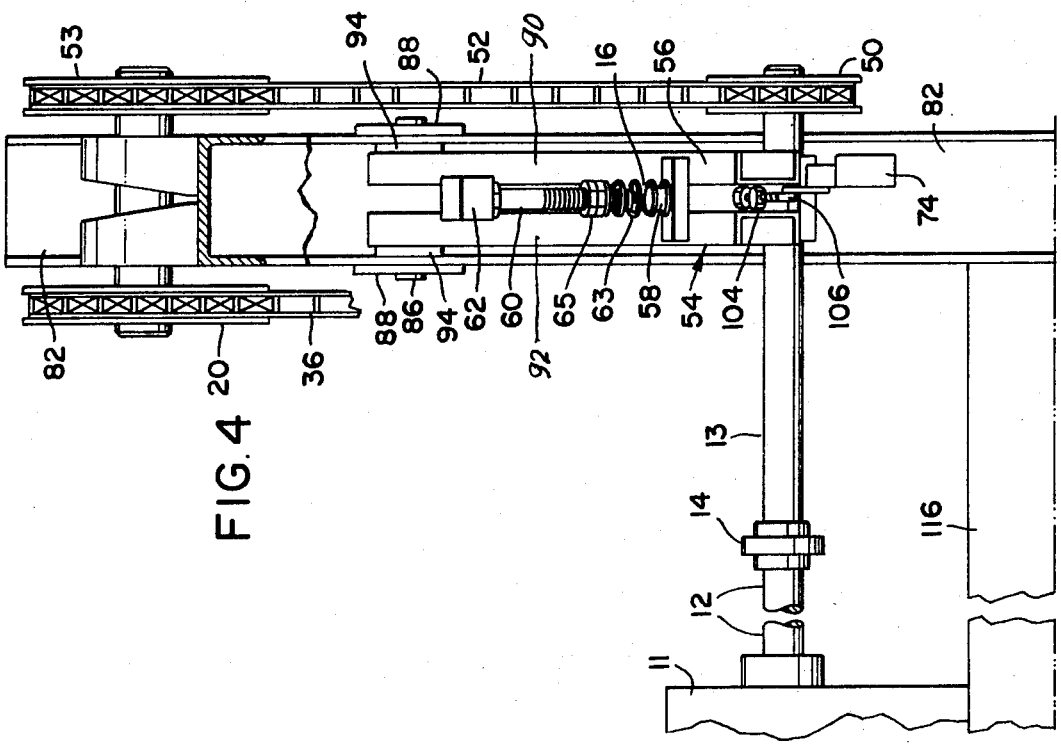

SAFETY CONVEYOR

BACKGROUND OF THE INVENTION

The present invention relates in general to the heavy equipment industry and more particularly, is directed to a conveyor system for transporting heavy, elongate loads, such as drums, rolls of papers, logs and similar articles without damage to the conveyor equipment.

It has been the usual practice to transport heavy loads by utilizing conveyor equipment of the endless chain type and driven by motors through the usual gear drive mechanism. All prior art devices incorporated structural steel framing, driving and driven sprockets, driving motors, speed reducing gear trains where required and means to pick up and carry the heavy loads from one location to another. Because of the bulk and weight of the heavy loads such as rolls of paper, loaded drums, or other articles being handled, all of the equipment had to be massive in construction and capable of withstanding severe shocks, heavy loads and general industrial abuse. Because of the weight and size of the equipment, its very rugged nature rendered it expensive to fabricate and also relatively expensive to maintain.

In case of a stoppage caused by foreign material jamming at the sprockets or other critical areas, costly maintenance and repair procedures resulted due to extended periods of "down" time and the difficulty of repairing weighty parts occasioned by the bulky nature of the machine. Should foreign material enter a sprocket of a prior art conveyor to jam the chain conveyor, the motor would continue to function to continually power the system in spite of the jam. Due to the rugged nature of the motor and the drive and the momentum developed by the weight of the equipment and load, the continued operation of the system after jamming would result in the complete breakdown at some point in the system before an operator would become aware of any unusual condition. In addition to the time and expense involved in clearing the jam itself, such mechanical failure greatly increased the cost of repairs and the length of "out-of-service" time for the equipment.

SUMMARY OF THE INVENTION

The present invention relates to a conveyor system for transporting heavy, elongate loads incorporating construction features designed to prevent damage to the operating equipment caused by jams of similar troubles.

The instant conveyor system includes a gear reducing drive powered by an electric motor in the usual manner to turn a driving sprocket through a drive shaft which incorporates an intermediate flexible coupling. The outward end of the drive shaft journals upon a pivot arm which is arranged to permit limited relative vertical movement of the driving sprocket upon occurrence of a jam in the conveyor system. Additionally, the pivot arm carries means to automatically interrupt the electrical current supply to the driving motor upon a jam in the system of sufficient severity to cause the driving sprocket to move vertically with respect to the conveyor system. In this manner, automatic safetyguards are built into the machinery to elevate the driving sprocket by elevating the drive shaft about the flexible coupling to thus automatically interrupt the current to the electric motor upon occurrence of a stoppage in the system. The safety features have been designed to be rapidly responsive to system troubles thereby quickly functioning to prevent severe damage to the equipment.

It is therefor an object of the present invention to provide an improved safety conveyor of the type set forth.

It is another object of the present invention to provide a safety conveyor incorporating a driving sprocket and means to raise the sprocket automatically upon occurrence of a jam in the conveyor system.

It is another object of the present invention to provide a safety conveyor including a driving sprocket and means to elevate the driving sprocket upon occurrence of a jam in the system, the said elevating means including means to automatically interrupt the power supply to the driving motor.

It is another object of the present invention to provide a safety conveyor including an electrical driving motor and automatic means to interrupt the power supply to the driving motor upon occurrence of a jam anywhere within the conveyor system mechanism.

It is another object of the present invention to provide a safety conveyor that is rugged in construction, simple in design and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 2 is a cross sectional view taken along Line 2—2 of FIG. 1, looking in the direction of the arrows.

FIG. 3 is an enlarged, detailed view of the conveyor power interrupting mechanism.

FIG. 4 is a cross-sectional view taken along line 4—4 of FIG. 3, looking in the direction of the arrows and showing the power interruptin mechanism in driving relation.

FIG. 5 is a cross sectional view similar to FIG. 4 showing the power interrupting mechanism in tripped position.

FIG. 7 is a schematic wiring diagram of the electrical power circuit.

DESCRIPTION OF THE PREFERRED EMBODIMENT OF THE INVENTION

Figure 1:
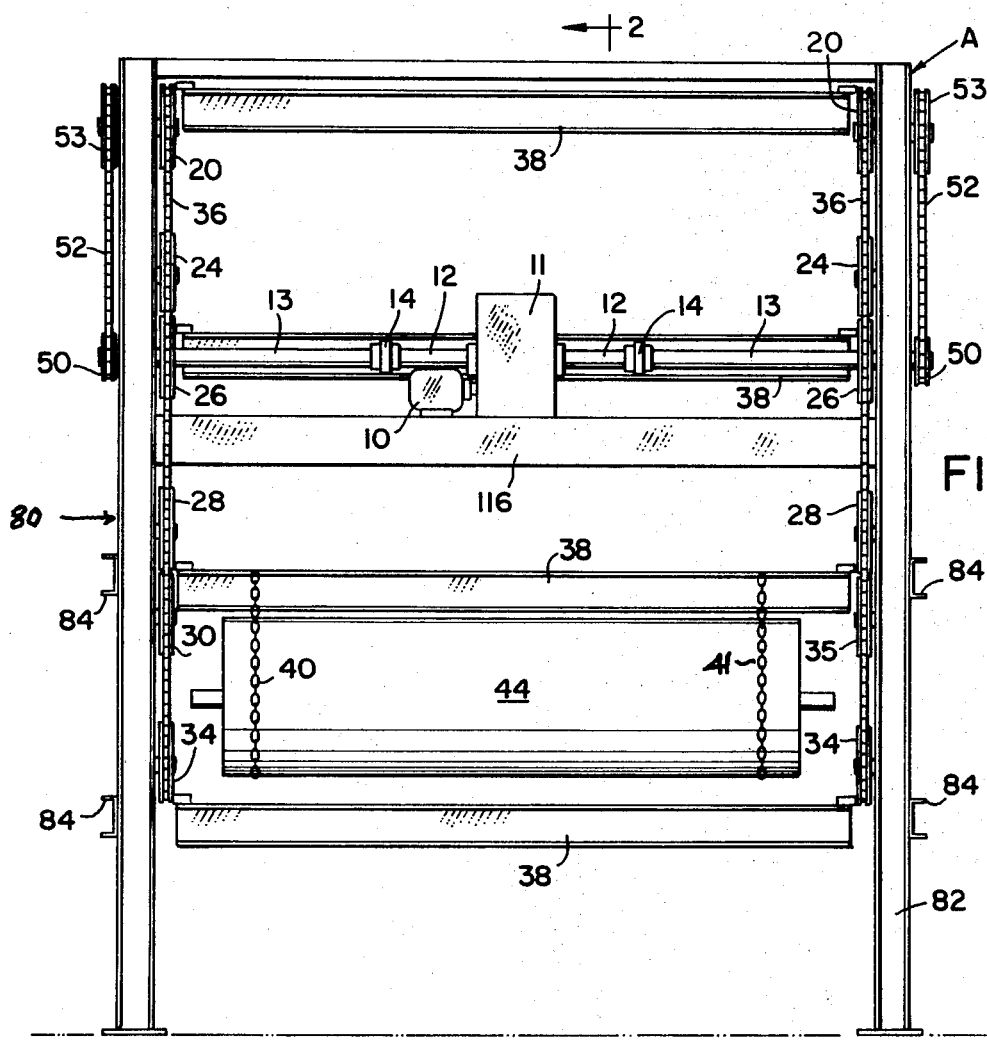
FIG. 1 is a front elevational view of a safety conveyor constructed in accordance with the present invention.

Although specific terms are used in the following description for the sake of clarity, these terms are intended to refer only to the particular structure of my invention illustrated in the drawings, and are not intended to limit the scope of the invention.

Referring now to the drawings, I show in FIG. 1 a safety conveyor generally designated A and including a structural steel frame 80 incorporating a plurality of vertical supports 82 and horizontal structural members 84 which are welded, rivetted, or otherwise secured to the vertical members 82 to provide a rigid, extremely strong and sturdy structure. A motor 10 drives the endless conveyor chain 36 through a speed reducer drive 11 in the usual manner to transport heavy loads such as drums 44 across the conveyor system.

As best seen in FIG. 2, the conveyor chains 36 are of the endless type and turn about the respective idler sprockets 22, 24, 26, 28, 30, 32 and 34 to carry the loads 44 in conventional manner. The driving sprocket 50 powers the conveyor chain 36 through the driven sprocket 53, the driving chain 52 and the chain driving sprocket 20.

The drive shaft 13 turns the driving sprocket 50 and journals at one end of the pivot arm 54 to function the power interrupting mechanism as hereinafter more fully set forth.

Figure 6:
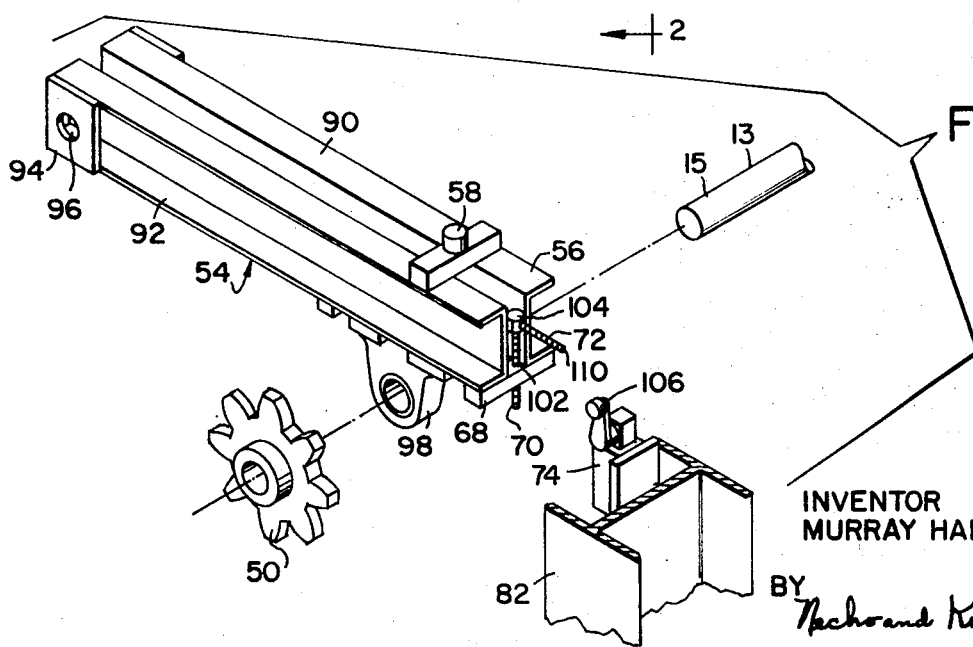
FIG. 6 is a partial, enlarged, exploded view showing the functioning parts of the power interrupting mechanism.

Referring now to FiG. 6, I show the pivot arm 54 in detail wherein a pair of spaced channel sections 90, 92 arrange in web to web position for pivotal connection at the frame affixed support 88. The channel sections 90, 92 join at one end thereof by employing a block 68 welded or otherwise affixed thereto and connect at the other end thereof by utilizing the pivot plate 94. A transverse opening 96 pierces the pivot plate 94, the fixed support 88 and the webs of the channel sections 90, 92 to therein receive the pivot pin 86 to thus allow the pivot arm 54 to rotate upwardly about the support 88. A bearing 98 bottomly connects to the bottom legs of the channel sections 90, 92 and journals the lateral end 15 of the drive shaft pivotal portion 13.

A threaded stud 60 mounts upon the block 62 which affixed to the vertical machine support 82 above the electrical switch 74 and arcuately aligns with the pivot arm connected spring mount finger 58 leaving a gap 16 of sufficient length to permit arcuate movement of the pivot arm 54 about the pivot 86 to permit the adjusting screw 72 to swing clear of the movable switch arm 106 for circuit interruption purposes. A coil spring 63 mounts over the spring mount finger 58 and the stud 60 and biases between the top legs of the channels 90, 92 and the adjustable spring tension nuts 65 which threadedly adjust upon the stud 60. The spring 63 continually urges the pivot arm 54 to the normal, circuit closed position as indicated in full lines in FIG. 3. The bias of the spring 63 further serves to resist rotative motion of the arm 54 by imposing an initial load thereon to thus prevent inadvertent opening of the switch 74 through momentary jams or other self-correcting operations of the safety conveyor. The threaded stud 60 further serves to limit the rotative motion of the pivot arm 54 to a travel distance equal to the gap 16 which is just sufficient to open the switch 74 as illustrated in FIG. 5. Once the motor 10 has been stopped by operation of the switch 74, the spring 63 functions to bias the pivot arm 54 from the circuit interrupting position to the position illustrated in FIGS. 3 and 4.

The driving sprocket 50 pins or otherwise secures to the drive shaft 13 outwardly from the bearing 98 to transmit driving power from the motor 10 to the conveyor chain 36. The block 68 is vertically drilled and tapped to provide a threaded opening 102 to threadedly receive therein the adjusting screw 70 which turns within the opening 102 to readily permit vertical adjustment. The adjusting screw 70 terminates upwardly in a solid head 104 which may be hexagonal in shape for adjustment utilizing conventional tools and which is horizontally drilled and tapped to receive the second adjusting screw 72 therein. Thus, it is seen that vertical and horizontal adjustment may conveniently be made at the end of the of the movable arm 54 by means of the cooperating adjusting screws 70, 72.

As best seen in FIGS. 3 and 6, a movable arm switch 74 affixes to the flange of one vertical machine support 82 and positions in general alignment with the pivot arm 54 to cooperate with the adjusting screw 72. The switch 74 includes a movable arm 106 and is wired into the main motor operating electrical circuit 108 for motor control purposes. As illustrated, the movable switch arm 106 closes the switch 74 when in the vertical position to close the circuit 108 and is spring biased in well-known manner to rotate to the horizontal position to thereby open the circuit 108. It is thus seen that the adjusting screws 70, 72 readily adjust to position the end 110 of the adjusting screw 72 against the movable arm 106 to thereby maintain the switch arm 106 against the bias of its associated spring (not shown) during periods of normal conveyor use when the pivot arm assumes the operating position illustrated in FIG. 3. Should the pivot arm 54 be rotated upwardly about the pin 86 by the occurrence of a jam in the conveyor system, the end 110 of the adjusting screw 72 will ride upwardly and out of contact with the movable arm 106. The internal spring (not shown) of the switch 74 then rotates the arm 106 in a counter-clockwise direction to open the switch and thus open the motor circuit 108 to automatically stop the motor 10.

The gear reducing drive 11 positions upon the machine frame 80 and secures to the frame connected supports 116, 118 in operative arrangement with the driving motor 10 to rotate the drive shaft 12 in conventional manner. A flexible coupling 14 divides the drive shaft 12 and defines the pivotal portion 13 of the drive shaft laterally outwardly from the coupling 14. The lateral end 15 of the pivotal portion 13 journals within the pivot arm bearing 98 and rotates the end affixed drive sprocket 50 in response to the motor operation. It should be noted that the bearing 98 has rotative motion about the frame connected pivot pin 86. Accordingly, should the bearing 98 be elevated by the drive sprocket 50 as it rides up the driving chain 52 in response to mechanical trouble in the conveyor system, the pivotal portion 13 of the drive shaft 12 will also be elevated inasmuch as it journals within the bearing 98. Flexure at the flexible coupling 14 permits continued rotative operation of the drive shaft 12 without damage to either the drive shaft 12 or the gear reduction drive 11.

In operation, a plurality of load carrying channel sections 38 transversely ride upon the chains 36 of the safety conveyor A and bottom position with respect to the chains as best seen in FIGS. 1 and 2. A heavy, elongate load such as a drum 44 suspends from the channel section 38 by means of the carrier chains 40, 41 which loop over the channel section 38 near its lateral ends for transporting by the conveyor in the direction indicated by the arrow 42. The conveyor chains 36 are driven by the motor 10 acting through the gear reducer 11, the drive shaft 12, 13, the drive sprocket 50, the drive chain 52, the driven sprocket 53 and its affixed chain driving sprocket 20. In the event of mechanical trouble such as jamming, for example, at sprocket 30, the motor 10 would normally continue to turn the driving sprocket 50. Because of the jam, the conveyor chains 36 and all driven sprockets would be stopped by the obstruction and the driving chain 52 would be unable to continue to turn the chain driving sprocket 20. Under such conditions, the sprocket 50 would tend to climb the driving chains 52 under rotative urging from the motor powered drive shaft 12, 13. The tendency of the driving sprocket 50 to climb the then stationary drive chain 52 would cause the pivot arm to pivot upwardly about the pin 86 and would also cause the pivot arm journalled shaft 13 to ride upwardly to follow the direction of the driving sprocket 50. The flexible coupling 14 serves to facilitate the flexure movement of the shaft 13 about the coupling 14 instantaneously when a jam occurs. Under such conditions, the upward movement of the shaft 13 and the pivot arm 54 also raises the end 110 of the adjusting screw 72 out of contact with the movable arm 106 of the electrical switch 74 to permit the arm 106 to drop under urging of its associated spring to automatically interrupt current flow through the motor circuit 108.

With the motor and the associated conveyor equipment automatically stopped, an operator will thus be made aware of mechanical trouble in the conveyor system by the automatic stoppage and can thus take remedial action to clear the mechanical trouble before breakage or other detrimental action can occur. The automatic power interruption prevents further operation of the machine until the switch arm 106 is manually reset.

As shown in FIG. 7 the electrical circuit 108 comprises a series circuit wherein current of the voltage required by the motor 10 is impressed upon the terminals 76, 78 and current flows to the motor 10 through the usual safety switch 112 and fusible device 114. The switch 74 also wires in series with the circuit 108 to thereby promptly shut down the motor 10 upon opening of the switch 74 as hereinbefore set forth.

I claim:

1. In a safety conveyor suitable for transporting heavy loads of the type wherein an electric motor rotates a drive shaft through a motor driven gear reducer drive and the second end of the drive shaft connects to a driving sprocket to power a conveyor chain, the combination of
   A. a supporting frame;
   B. pivotal means pivotally connected to the frame,
      1. said pivotal means carrying a bearing at one end thereof,
         a. the said bearing journalling to the said second end of the drive shaft,
      b. said pivotal means being urged from a first position to a second position by the driving sprocket upon the occurrence of a stoppage in the safety conveyor;
   C. elevating means associated with the said drive shaft,
      1. said elevating means permitting elevating movement of the said second end of the drive shaft with respect to the said motor when the pivotal means are urged to the second position; and
   D. electrical current interrupting means responsive to pivotal movement of the said pivotal means to the second position,
      1. said current interrupting means permitting electrical current to power the said motor when the pivot arm is in the first position,
      2. said current interrupting means preventing electrical current flow to the said motor when the pivot arm moves to the said second position.

2. The invention of claim 1 wherein the drive shaft elevating means include a flexible coupling, the said coupling permitting flexure of the said second end of the drive shaft with respect to the said first end.

3. The invention of claim 2 wherein the said elevating means position on the drive shaft intermediate the gear reducer drive and the second of the said drive shaft.

4. The invention of claim 1 wherein the said pivotal means are provided with initial load means to retard movement from the first position to the second position.

5. The invention of claim 4 wherein the said initial load means include a coil spring biasing between the pivotal means and the frame.

6. The invention of claim 4 wherein the said initial load means also serve to bias the said pivotal means to the first position.

7. The invention of claim 1 wherein the said electrical current interrupting means include a micro switch with a movable arm, the said arm having a first, current passing position and the said arm being spring biased to a second, current interrupting position.

8. The invention of claim 7 and an adjustable, movable arm contacting screw mounted upon the said pivotal means, said screw maintaining the movable arm in the first position when the pivotal means assume the said first position.

9. The invention of claim 1 wherein the said elevating means include a flexible coupling.

* * * * *